3,147,253
PROCESS FOR MANUFACTURING ALPHA,BETA-DI-[ARYLOXAZOLYL-(2)]-ETHYLENE
Masao Iizuka and Masao Yamamoto, Yokohama, Joji Matsumura, Musashino, and Makoto Yoshida, Yokohama, Japan, assignors to Hodogaya Kagaku Kogyo Kabushiki Kaisha, Tokyo, Japan, a corporation of Japan
No Drawing. Filed June 8, 1962, Ser. No. 200,973
Claims priority, application, Japan, June 17, 1961, 36/21,176; Aug. 8, 1961, 36/27,906
10 Claims. (Cl. 260—240)

This invention relates to the production of ethylene derivatives and is more particularly concerned with a new and improved process for manufacturing alpha,beta-di-[aryloxazolyl-(2)]-ethylene compounds represented by the general formula:

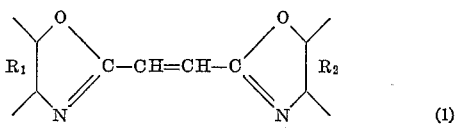

wherein $R_1$ and $R_2$ each is a substituted or unsubstituted aryl radical fused respectively to the oxazole ring, the compounds being used as optical brightening agents. Briefly stated, the ethylene compounds above specified according to the present invention are prepared by reacting acylamino compound of the general formula:

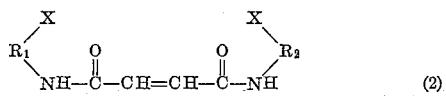

wherein $R_1$ and $R_2$ each stands for a substituted or unsubstituted aryl radical and each X for a halogen atom such as chlorine and bromine in a position adjacent the —NH— group, in the presence of catalyst with acid-binding agent.

The new process of this invention is distinguishable over the known arts for manufacturing alpha,beta-di-[aryloxazolyl-(2)]-ethylene compounds, in which arts ortho-hydroxy acylamino aryl compound is without exception employed as the starting material, by the fact that the said ethylene compounds are advantageously obtained by starting from the specified ortho-halogen substituted acylamino aryl compound which is easily accessible from ortho-halogen amino aryl compound.

The ortho-halogen amino aryl compound from which the particular starting material used in the present invention is derivable may further contain in the aryl nucleus another substituent such as for example, an alkyl group such as methyl, ethyl, octyl and the like or an alkoxy group such as methoxy, ethoxy and the like. There may be mentioned, for example, the following compounds without limitation: 1-amino-2-chlorobenzene, 1-amino-2-bromobenzene, 1-amino-2-chloro(or bromo)-5-methylbenzene, 1-amino-2-chloro(or bromo)-4-methylbenzene, 1-amino-2-chloro(or bromo)-5-methoxybenzene, 1-amino-2-chloro(or bromo)-3,5-dimethylbenzene, 1-amino-2-chloro(or bromo)-5 tertiary octyl benzene and the like. It has been observed that the oxazole ring forming reaction proceeds more favourably when the process according to the present invention starts from acylamino compounds derived from the bromine-substituted amino compounds rather than the corresponding chlorine-substituted ones.

The ortho-halogen-amino aryl compounds abovementioned, particularly those which contain further a substituent such as an alkyl group capable of enhancing the excellent optical brightening effect of the final product to be obtained therefrom according to the present invention are the substances which are broadly employed as intermediates or obtained as by-products in the field of manufacturing dyestuffs such as naphthol dyestuffs and the like, and are commercially available in abundance and hence the technical merit of the present invention is highly appreciated from the commercial view-point.

The halogen-substituted acylamino aryl compound of the general Formula 2 used as starting material according to the present invention may be produced readily be reacting fumaric acid dihalide, for example, in an inactive solvent with two mols of the ortho-halogen-substituted primary arylamine as aforementioned.

In carrying out the present invention, the acylamino compound having halogen atom at ortho-position to the amino group thus obtained is then treated in the presence of catalyst with an acid binding agent. The following compounds may be mentioned as examples of the acid binding agent:

An inorganic or organic compound of alkali metal such as carbonate, bicarbonate or acetate of sodium or potassium, and organic basic substances such as, for example, aliphatic amines such as butylamine, dibutylamine, triethyl amine as well as organic bases derived from coal tar, such as pyridine, picoline, lutidine and quinoline. These acid binding agents will serve as neutralizing agents for hydrogen chloride or bromide resulting from the oxazole ring closure according to the present invention.

It has been found that the preferred reaction temperature for performance of the oxazole ring closure by means of an inorganic acid binding agent according to the present invention is in a range of from 150° C. to 200° C., and accordingly, the process may advantageously be conducted in a reaction medium of organic solvent having a boiling point higher than 150° C. such as, for example, nitrobenzene, ortho-dichlorobenzene, trichlorobenzene, naphthalene, chloro-naphthalene, dimethylformamide and high boiling point hydrocarbons of petroleum series. It has farther been found that the ring closure reaction according to the present invention proceeds more rapidly even at a temperature below 150° C. when an organic base as acid binding agent is used rather than an inorganic acid binding agent and hence under such a reaction condition, it is possible to obtain the intended product of high purity in good yield. As preferred solvent, there may be mentioned dimethylformamide and hydrocarbons of petroleum series.

As for catalyst effective for promoting the reaction, copper salts such as cupric acetate, cuprous and cupric chlorides and pulverised metallic copper, are mentioned, and a satisfactory result is obtained when the reaction is carried out by using cupric acetate together with an organic base as acid binding agent. A formation of a certain complex compound of the copper salt in the reaction system is presumable in that case.

The following examples will further illustrate this invention. The parts specified are parts by weight:

*Example 1*

5 parts of acylamino compound of the formula:

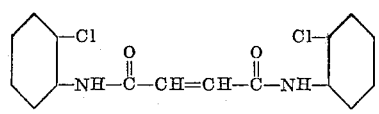

0.1 part of cuprous chloride, 0.25 part of copper oxide and 5 parts of anhydrous sodium acetate are stirred in 110 parts of nitrobenzene. The reaction mixture thus obtained is heated in a current of gaseous nitrogen to the temperature of 200° C. and further kept at the said temperature for ten hous. On cooling the reaction mixture to a temperature below 10° C., the resulting crystalline substance is filtered, washed with a small amount of benzene and dried.

The product is further treated with an aqueous dilute sulphuric acid for the purpose of removing the copper salt which may contaminate the product and again dried.

There is thus obtained alpha,beta-di-[benzoxazolyl-(2)]-ethylene. By crystallizing it from ethanol or dioxane, there is obtained pale yellow crystalline powder melting at 246-248° C. and corresponding to the formula:

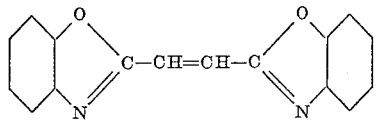

Same substance is obtained when the process is carried out without addition of the copper oxide. The reaction velocity under this circumstance, however, is somewhat reduced.

The acylamino compound used as starting material in this example may be obtained as follows:

To a solution of 25.5 parts of 1-chloro-2-aminobenzene in 290 parts of monochlorobenzene are added 15.3 parts of fumaric acid dichloride drop by drop within one hour at a temperature between 120° C. and 125° C. The whole is gently boiled for six hours and the reaction product is filtered, washed with small amounts of benzene and ethanol, and again washed successively with dilute aqueous hydrochloric acid and a dilute aqueous solution of sodium carbonate and dried. There is thus obtained the product aimed at in the form of white crystalline powder melting at 300-302° C.

Example 2

5 parts of the compound having the formula:

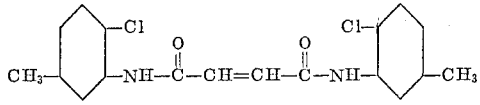

and melting at 297-300° C. are heated with 0.15 part of cuprous chloride, 0.2 part of copper oxide and 5 parts of potassium acetate in trichlorobenzene while excluding air under reflux for three hours.

The reaction mixture is cooled and further worked up in accordance with the procedure as mentioned in Example 1. There is thus obtained in good yield alpha,beta-di-[5-methylbenzoxazolyl-(2)]-ethylene of the formula:

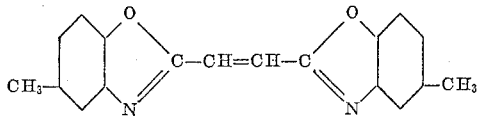

The product when recrystallized from ethanol gives pale yellow, crystalline needles melting at 183-184° C.

Example 3

1.0 part of cupric acetate and 4.9 parts of pyridine in 14.2 parts of dimethylformamide are heated to boil for half an hour and then cooled. There is therein introduced 1.1 parts of the compound of the formula:

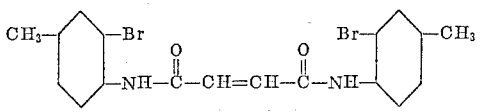

which melts at 325° C.

The mixture is allowed to react by heating while stirring to 135-137° C. for three hours. On cooling, the reaction product separates out which is filtered, washed with a small amount of dimethylformamide, dried and then recrystallized from ethanol.

There is thus obtained in good yield alpha,beta-di-[6-methylbenzoxazolyl-(2)]-ethylene of the formula:

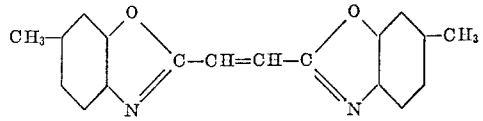

in the form of pale yellow crystalline needles melting at 191-192° C.

Example 4

The process is carried out in the manner analogous to that mentioned in Example 3 but by employing the compound melting at 202-203° C. and having the formula:

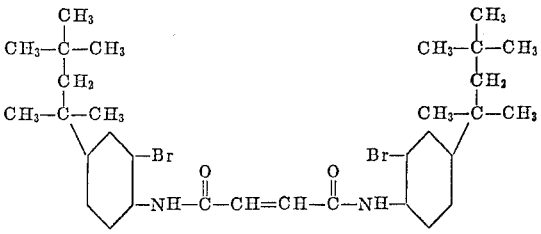

There is thereby obtained alpha,beta-di-[6-tert.-octylbenzoxazolyl-(2)]-ethylene of the formula:

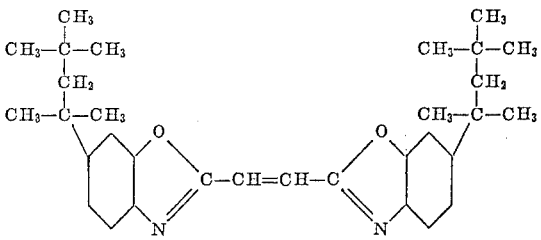

The product after being recrystallized from dimethylformamide melts at 116-117° C.

Example 5

1.0 part of cupric acetate and 5.2 parts of triethylamine in 15.5 parts of dimethylformamide are heated to boil for half an hour and cooled.

To the mixture are introduced 1.1 parts of the compound melting at 315-317° C. and having the formula:

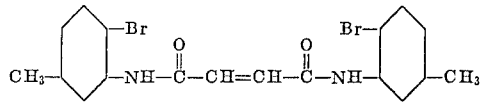

and the whole is then subjected to reaction by heating while stirring to 135-137° C. for five hours.

The reaction mixture is cooled and the product separated out is filtered and dried.

On recrystallizing from ethanol, alpha,beta-di-[5-methylbenzoxazolyl-(2)]-ethylene of the formula:

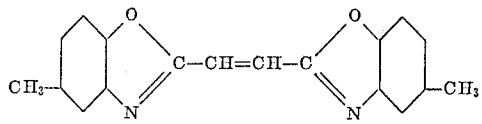

is obtained in the form of pale yellow crystals having melting point of 185-186° C.

Example 6

4.8 parts of the compound represented by formula:

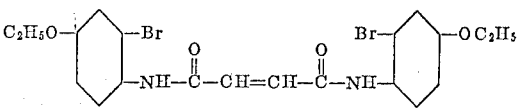

melting at 269-271° C., 1.0 part of finely divided metallic copper and 7.5 parts of 2,4-lutidine are stirred into 45 parts of dimethylformamide.

The whole is subjected to reaction by heating at 142–143° C. for thirty hours, cooled and further worked up by procedure the same as that mentioned in Example 4. There is thus obtained alpha, beta-di-[6-ethoxybenzoxazolyl-(2)]-ethylene of the formula:

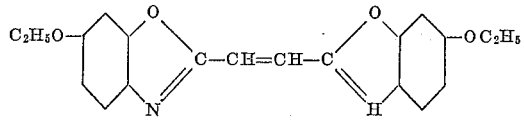

in the form of light yellow crystals melting at 207–208° C.

*Example 7*

5.0 parts of the compound of the formula:

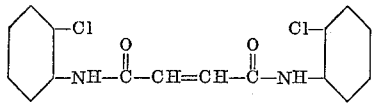

melting at 300–302° C., 2.0 parts of finely divided metallic copper and 9.6 parts of pyridine are introduced in 59 parts of trichlorobenzene and the whole is refluxed for twenty hours. The reaction product is further worked up by procedure the same as that mentioned in Example 4. There is thus obtained alpha,beta-di-[benzoxazolyl-(2)]-ethylene of the formula:

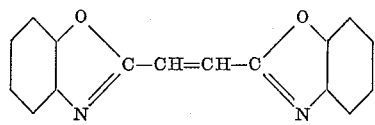

On recrystallizing from ethanol, it forms crystalline powder having the melting point of 246–248° C.

Similar result is obtained after about thirty hours' reflux, when the trichlorobenzene in this example is replaced by 68 parts of pyridine serving as both the acid binding agent and solvent.

What we claim is:
1. A process for manufacturing alpha,beta-di-[aryloxazolyl-(2)]-ethylene of the formula:

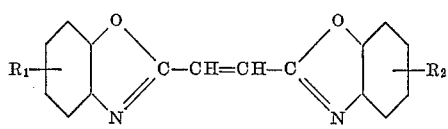

wherein each of $R_1$ and $R_2$ is a member selected from the group consisting of H, lower alkyl and lower alkoxy, in which process the acylamino compound of the formula:

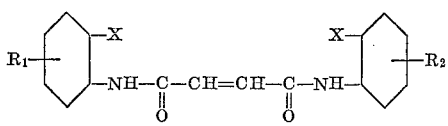

wherein $R_1$ and $R_2$ have the previously-recited significances and X is a member selected from the group consisting of Cl and Br positioned ortho to the —NH— group, is heated with hydrohalide acceptor at a temperature between 110° C. to 200° C. in the presence of catalyst selected from the group consisting of metallic copper, copper oxide, cupric acetate, cupric chloride and cuprous chloride.

2. A process according to claim 1, in which the hydrohalide acceptor is a compound selected from the group consisting of inorganic alkali metal salts, coal tar bases and aliphatic amines.

3. A process for the preparation of

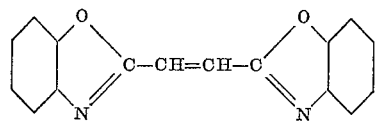

which comprises heating

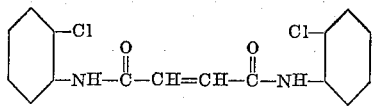

to 200° C. in nitrobenzene containing cuprous chloride as catalyst and alkali metal acetate as hydrohalide acceptor.

4. A process for the preparation of

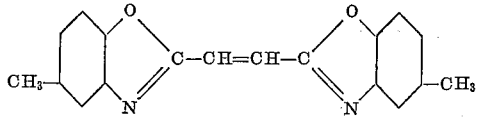

which comprises refluxing

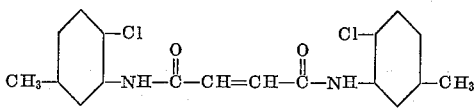

in trichlorobenzene containing cuprous chloride as catalyst and alkali metal acetate as hydrohalide acceptor.

5. A process for the preparation of

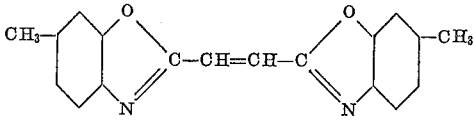

which comprises heating

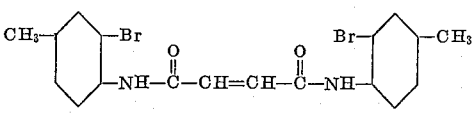

to 135–137° C. in dimethylformamide containing cupric acetate as catalyst and pyridine as hydrohalide acceptor.

6. A process for the preparation of

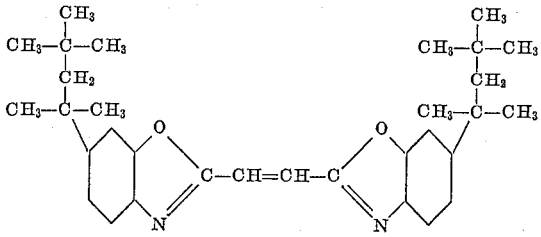

which comprises heating

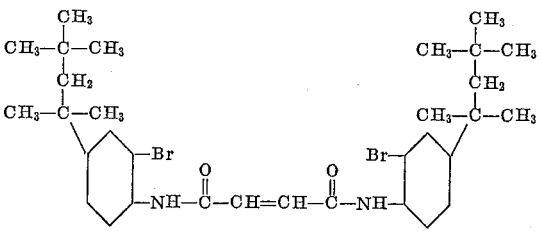

to 135–137° C. in dimethylformamide containing cupric acetate as catalyst and pyridine as hydrohalide acceptor.

7. A process for the preparation of

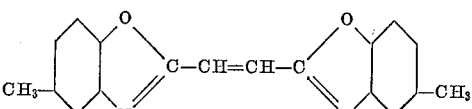

which comprises heating

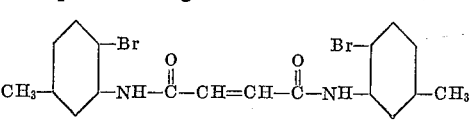

to 135–137° C. in dimethylformamide containing cupric acetate as catalyst and triethylamine as hydrohalide acceptor.

8. A process for the preparation of

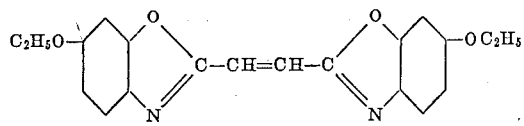

which comprisis heating

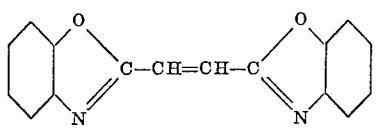

to 142–143° C. in dimethylformamide containing metallic copper as catalyst and lutidine as hydrohalide acceptor.

9. A process for the preparation of

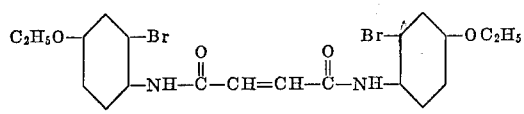

which comprises refluxing

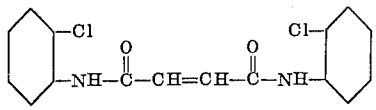

in trichlorobenzene containing metallic copper as catalyst and pyridine as hydrohalide acceptor.

10. A process for the preparation of

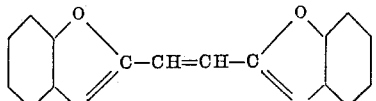

which comprises refluxing

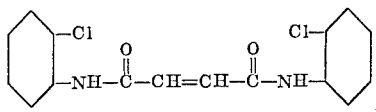

in pyridine containing metallic copper as catalyst, the pyridine functioning simultaneously as hydrohalide acceptor and as solvent medium for the reactants.

References Cited in the file of this patent

UNITED STATES PATENTS

| | | |
|---|---|---|
| 1,936,949 | Nawiasky et al. | Nov. 28, 1933 |
| 2,299,826 | Kern et al. | Oct. 27, 1942 |
| 2,483,392 | Meyer et al. | Oct. 4, 1949 |

FOREIGN PATENTS

| | | |
|---|---|---|
| 835,892 | Great Britain | May 25, 1960 |
| 835,898 | Great Britain | May 25, 1960 |

OTHER REFERENCES

Stephens et al.: J. Chem. Soc., 1949, pages 2971 to 2972, QD 1 C6.

Hrutford et al.: J. Am. Chem. Soc., vol. 80, pages 2021 to 2022 (1958), QD 1 A5.

Theilheimer: "Synthetic Methods of Organic Chemistry," vol. 13, page 306 (Synthesis No. 631), Interscience Publishers Inc., N.Y. (1958), QD 262 T4.

Elderfield: "Heterocyclic Compounds," vol. 5, pages 431 to 432, John Wiley and Sons, New York (1957), QD 400 E4.

Chemical Abstracts, Fifth Decennial Index, page 5355s (1960), QD 1 A51.